MILLER & WRIGHT.
Plow Fender.
No. 85,118.  Patented Dec. 22, 1868.
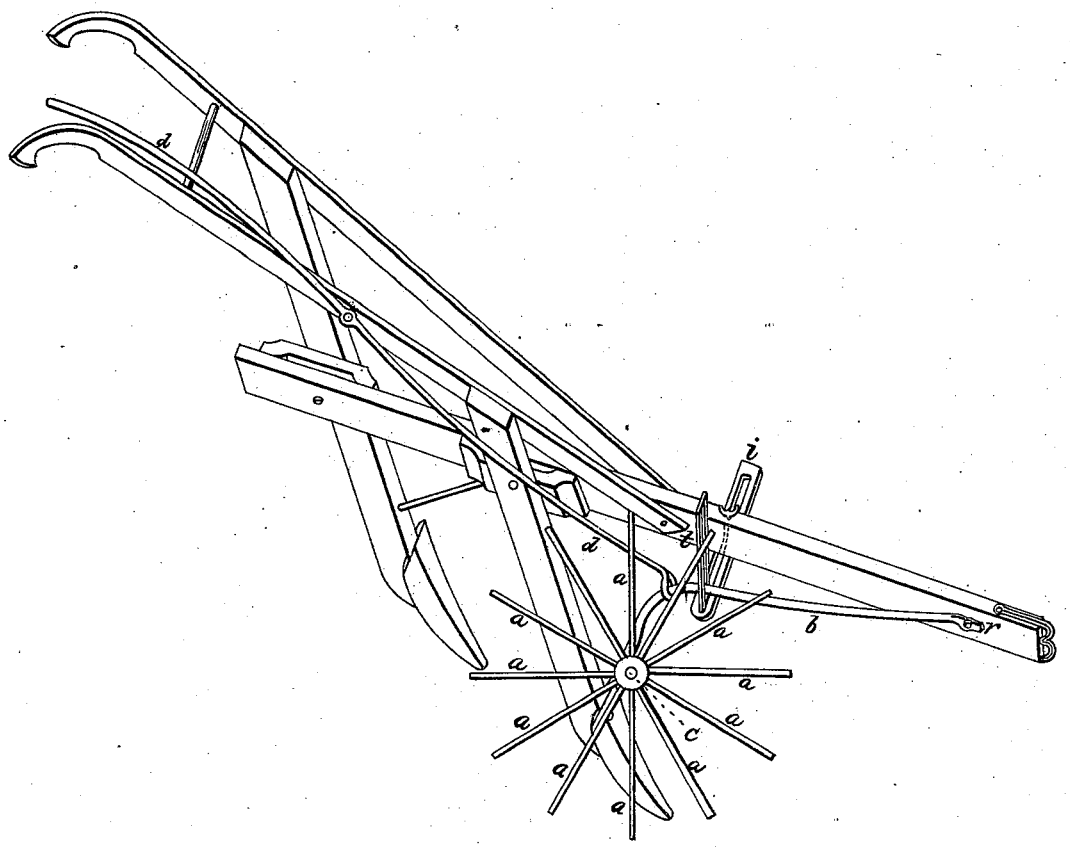
Witnesses:
Artemas Robert
B. J. Boydston
Inventors:
Samuel J. Miller
Luna Wright
By Joseph Ridge
their atty.

SAMUEL J. MILLER AND LUNA WRIGHT, OF ECONOMY, INDIANA.

Letters Patent No. 85,118, dated December 22, 1868.

IMPROVEMENT IN CORN-PLOW.

The Schedule referred to in these Letters Patent and making part of the same.

*To all whom it may concern:*

Be it known that we, SAMUEL J. MILLER and LUNA WRIGHT, of Economy, Wayne county, Indiana, have invented a new and useful Improvement in Corn-Plows; and we do hereby declare that the following is a full and exact description thereof, reference being had to the accompanying drawing, making a part of this specification.

The nature of our invention consists in providing corn-plows, or other cultivators, with a fender, that runs between the shovel of a plow or cultivator and the row of corn, for the purpose of preventing the corn, when small, from being covered with clods. The fender is also a valuable adjunct to the plow when used for the purpose of covering corn, in which case the loose soil only is thrown on the corn.

To enable others skilled in the art to make and use our invention, we will proceed to describe the same, with reference to the drawings.

The fender is composed of a series of radial arms, $a\ a$, &c., fixed in a centre or hub, C, to which latter the end of rod $b$, the latter having a short horizontal section for that purpose, serves as an axle.

Rod $b$ is pivoted to the plow-beam, at $r$, and extends through a slotted standard, $t$.

$d$ is a lever, having it fulcrum on a bolt, at $e$, and having one end provided with an eye or loop, through which rod $b$ passes. The other end of lever $d$ occupies a position in proximity to the plow-handle; the object of lever $d$ being to raise the fender from the ground, and over any obstruction. It is thus conveniently done by depressing the upper end of said lever, the standard $t$ serving to hold rod $b$ in position laterally, and at the same time admit of its necessary vertical motion.

The standard $t$ is secured on a horizontal slotted bar, $i$. The latter being secured to the under side of the plow-beam, by means of a bolt, the head of which holds the bar, the bolt is secured in the beam by a nut on top, and may thus be loosened, and the bar $i$ slipped either way, across the beam, for the purpose of adjusting the fender to or from the plow, to suit the distance of the latter from the corn-row, as may be required by the size of the corn.

In the operation of the plow, the fender rotates, with the ends of the arms successively in contact with the ground, by reason of which but little additional power is required for propelling the fender, it being light in construction, and the ends of the arms only coming in contact with the ground, no accumulation of soil can adhere to it, to increase its weight.

Having thus fully described our said invention,

What we claim, and desire to secure by Letters Patent, is—

The fender, with the rod $b$, lever $d$, slotted bar $i$, and slotted standard $t$, in combination with a corn-plow, substantially as set forth.

<div style="text-align:right">SAMUEL J. MILLER.<br>LUNA WRIGHT.</div>

Witnesses:
   JOSEPH RIDGE,
   ARTEMAS ROBERTS.